United States Patent
Medvinsky (10) Patent No.: US 8,538,890 B2
(45) Date of Patent: Sep. 17, 2013

(54) ENCRYPTING A UNIQUE CRYPTOGRAPHIC ENTITY

(75) Inventor: Alexander Medvinsky, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 667 days.

(21) Appl. No.: 12/549,468

(22) Filed: Aug. 28, 2009

(65) Prior Publication Data

US 2010/0058047 A1    Mar. 4, 2010

Related U.S. Application Data (60) Provisional application No. 61/092,612, filed on Aug. 28, 2008.

(51) Int. Cl.
*G06Q 20/00* (2012.01)
*H01B 3/00* (2006.01)

(52) U.S. Cl.
USPC ............. 705/59; 705/16; 705/21; 380/262; 380/278; 380/279

(58) Field of Classification Search
USPC .............. 705/59, 16, 21, 70, 74; 380/262, 380/278, 279
See application file for complete search history.

(56) References Cited

U.S. PATENT DOCUMENTS

| | | | | |
|---|---|---|---|---|
| 4,864,615 | A * | 9/1989 | Bennett et al. | 380/239 |
| 6,367,017 | B1 * | 4/2002 | Gray | 726/9 |
| 6,986,044 | B1 * | 1/2006 | Inada | 713/170 |
| 7,836,300 | B2 * | 11/2010 | Dellow et al. | 713/163 |
| 2003/0099358 | A1 * | 5/2003 | Michael et al. | 380/270 |
| 2005/0203853 | A1 | 9/2005 | Yamamoto et al. | |
| 2006/0005257 | A1 | 1/2006 | Tohru et al. | |
| 2006/0129848 | A1 | 6/2006 | Paksoy et al. | |
| 2006/0178170 | A1 * | 8/2006 | Chung et al. | 455/572 |
| 2006/0242069 | A1 | 10/2006 | Peterka et al. | |
| 2008/0126705 | A1 | 5/2008 | Jogand-Coulomb et al. | |
| 2008/0182592 | A1 | 7/2008 | Cha et al. | |
| 2010/0332816 | A1 * | 12/2010 | Murray | 713/2 |

OTHER PUBLICATIONS

PCT Search Report & Written Opinion, RE: Application #PCT/US2009/055291 Mar. 18, 2010.

\* cited by examiner

*Primary Examiner* — Dante Ravetti (57) ABSTRACT

A method of encrypting a unique cryptographic entity (UCE), where a client device receives a global-key (GK-) encrypted UKD comprising a GK-encrypted UCE and a GK-encrypted unit key number (UKN). The client device verifies that the GK-encrypted UKN is the same as a pre-provisioned value and then decrypts the GK-encrypted UKD using a global key (GK). The client device then re-encrypts the decrypted UKD using a device user key (DUK) to determine a DUK-encrypted UCE and a DUK-encrypted UKN. The DUK-encrypted UKN is verified as not equal to the GK-encrypted UKN. The DUK-encrypted UKN is then appended to the DUK-encrypted UCE to form a DUK-encrypted UKD and stored in a memory.

19 Claims, 6 Drawing Sheets

ENCRYPTING A UNIQUE CRYPTOGRAPHIC ENTITY

PRIORITY

The present application claims priority to U.S. provisional patent application No. 61/092,612, filed on Aug. 28, 2008, and entitled "PKI Data Format", which is incorporated by reference in its entirety.

BACKGROUND

Systems and methods for transferring or delivering digital information to various end user devices and/or products often involve a digital rights management (DRM) format or scheme that usually includes encrypting the content to be transferred and providing one or more decryption keys to authorized users or user devices for decrypting the encrypted content. One type of encryption scheme is public key encryption, which involves a public key and a corresponding private key. The public key is often widely published or distributed across a communications network, while the corresponding private key is held by the authorized end user device or product. In public key encryption, information encrypted with a public key is decrypted only with the corresponding private key.

In systems that use public key encryption, one concern is determining whether a public key is authentic, i.e., verifying that a received public key has not been copied, replaced or otherwise compromised. One manner to address this concern is through the use of a public key infrastructure (PKI). The PKI is generally a collection of servers and software that enables an organization to distribute and manage the distribution of public and private keys from a key generation facility (KGF) to products generated at a product personalization facility (for instance a factory or repair facility) in a manner that allows users to determine reliably the identity of the owner of each public/private key pair. The KGF is often a certificate authority (CA). The PKI often uses a CA to bind public keys with respective end users or end user products using public key certificates. In this manner, the CA is known to reliably identify the owner of each public/private key pair associated with each client device.

PKI data, including the private key, digital certificates and other unique cryptographic entities (UCEs) that are intended to be loaded into devices during mass production in a factory are typically generated encrypted with a global key because at the time of PKI data generation it is not known which specific client device will be loaded with the PKI data. Then, during manufacturing, the global-key encrypted PKI data is loaded into the device and the PKI data is later re-encrypted by firmware in the client device using a device unique key. During the manufacture or repair of the client device at a product personalization facility, the PKI data is loaded into each client device.

The product personalization facility in contrast with the KGF is not assumed to be a secure facility. There exists a possibility that PKI data and the client devices may be stolen. As described above, the PKI data is protected by encrypting the PKI data in the client device with a global key and then later the PKI data is supposed to be re-encrypted with the device unique key. However, in some situations, the PKI data may not be re-encrypted with the device unique key due to error or due to attempts to steal data. To satisfy DRM requirements, the PKI data is required to be encrypted with the device unique key rather than the global key so the PKI data is incapable of transfer and use on any other device. However, on some client devices the hardware that decrypts the PKI data during initialization does not indicate whether the PKI data was decrypted with the global key or with the device unique key. Thus, it is often not possible to reject the PKI data that was decrypted with the global key.

Client devices not being able to indicate whether the PKI data was decrypted with the global key or with the device unique key presents a problem for most DRM schemes that require device-specific PKI data to be decrypted with the device unique key in order to make all copies of the encrypted PKI data unusable on any other device. The global key normally exists in every device of a specific model. If an unauthorized party is able to install many copies of the same global-key encrypted private key into many client devices, these client devices can illegally share the same authorized identity and illegally share copies of protected content. Therefore, in these client devices, the inability to reject the PKI data that was decrypted with the global key creates security vulnerability and allows unauthorized access to content.

SUMMARY

Disclosed herein is a method of enforcing digital rights management. In the method, a client device receives a global-key encrypted unit key data, where the global-key encrypted unit key data comprises a global-key encrypted unique cryptographic entity and a global-key encrypted unit key number. The global-key encrypted unit key number is verified to be the same as a pre-provisioned value. The client device then decrypts the global-key encrypted unit key data using a global key to determine a decrypted unique cryptographic entity and a decrypted unit key number. Encryption is applied to the decrypted unique cryptographic entity and the decrypted unit key number using a device unique key to determine a device unique key encrypted unique cryptographic entity and a device unique key encrypted unit key number. Then, the device unique key encrypted unit key number is verified as not equal to the global-key encrypted unit key number. The device unique key encrypted unit key number is then appended to the device unique key encrypted unique cryptographic entity to form a device unique key encrypted unit key data and the device unique key encrypted unit key data is stored in a memory.

Also disclosed herein is a client device configured to enforce digital rights management rules. The client device comprises an input/output module configured to receive a global-key encrypted unit key data including a global-key encrypted unique cryptographic entity and a global-key encrypted unit key number from a key generation facility. The client device also includes a unit key number verification module configured to verify that the global-key encrypted unit key number in the client device is the same as a pre-provisioned value, and a decryption module configured to decrypt the global-key encrypted unit key data using a global key to determine a decrypted unique cryptographic entity and a decrypted unit key number. Further, the client device includes an encryption module configured to use a device unique key to encrypt the previously decrypted unit key number to determine a device unique key encrypted unit key number and to encrypt the previously decrypted unique cryptographic entity to form a device unique key encrypted unique cryptographic entity. Then, the unit key number verification module is configured to verify that the device unique key encrypted unit key number is not equal to the global-key encrypted unit key number. The encryption module is configured to thereafter append the device unique key encrypted unique cryptographic entity to the device unique key encrypted unit key number to determine a device unique key encrypted unit key data, and the client device is configured to store the device unique key encrypted unit key data in the memory.

Still further disclosed is a computer readable storage medium on which is embedded one or more computer programs implementing the above-disclosed method of enforcing digital rights management.

The embodiments of the invention provide a way of detecting encrypted unique cryptographic entities that were stored encrypted with the global key instead of a device unique key. Embodiments of the invention are useful for hardware platforms that perform hardware decryption and do not report whether the global key or the device unique key was used to decrypt the unique cryptographic entity. By using an embodiment of the invention, a client device is able to verify that the unique cryptographic entity has been uniquely re-encrypted by checking the value of the encrypted unit key number. This allows the client device to reject global-key encrypted copies of the unique cryptographic entity if the unique cryptographic entity is illegally copied or cloned into multiple devices. The unauthorized devices having the illegally cloned or copied unique cryptographic entity will not be allowed unauthorized access to content.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

The term "unique cryptographic entity (UCE)," refers to a unique cryptographic entity that may be loaded into a client device, for instance a private key. The term "encrypted unit key (EUK)," refers to the UCE which has been encrypted using another cryptographic key already present in the device, e.g., using a hardware key that has been burned into a chip.

The term "unit key number (UKN)," refers to a specific byte pattern that may be associated and appended to a UCE. The UKN may have different designations depending on the manner of determination of the UKN. For instance, a device unique key (DUK)-encrypted UKN refers to a UKN determined by the client device. Furthermore, global-key (GK)-encrypted UKN refers to a UKN encrypted with a global key.

The term "device user key (DUK)," refers to a chip unique key that may be used by a client device to encrypt a UCE.

The term "global key (GK)," refers to a key that may be used to encrypt a UCE and to decrypt, for instance a UCE or a UKD, during initialization of a client device. The GK may be widely held within one family of devices and is not a unique key. The value of the GK may still be highly sensitive confidential information and is typically not available outside of secure hardware.

The term "key generation facility (KGF)," refers to a facility at which a UCE may be generated. The KGF may be off-line. Additionally, the KGF may act as a CA.

The term "hardware specific information (HSI)," refers to information required by hardware in the client device, for instance an algorithm or a key type identifier.

The term "hardware validation service (HVS)," refers to a service that may be used to validate a UCE for a client device. For example, the validation service is a trusted authority to verify authenticity of information, such as a UCE.

The term "unit key data (UKD)," refers to data associated with a UCE. The UKD includes, at a minimum, the UCE and some form of UKN where the designation of the UKN is dependent on the location of the UKD and the manner of determination of the UKN. Further, the UKD may include additional optional data such as HSI and a signature. The UKD may change as the UKN associated with the UCE changes throughout the methods described herein below.

The term "non-random data (NRD)," refers to data that is not fully randomly generated, for instance a RSA private key, in contrast to the UKD, which may be fully randomly generated. The NRD may be partially, randomly generated.

A "manufacturer public/private key pair" is typically unique for a particular chip manufacturer, device manufacturer, specific chip model or for a specific device model. The manufacturer private key is kept in a secure facility such as the KGF while the corresponding manufacturer public key is typically included in every device of the same model to verify the source of code or data and that specific code or data was intended for a particular device or chip model.

Figure 1:
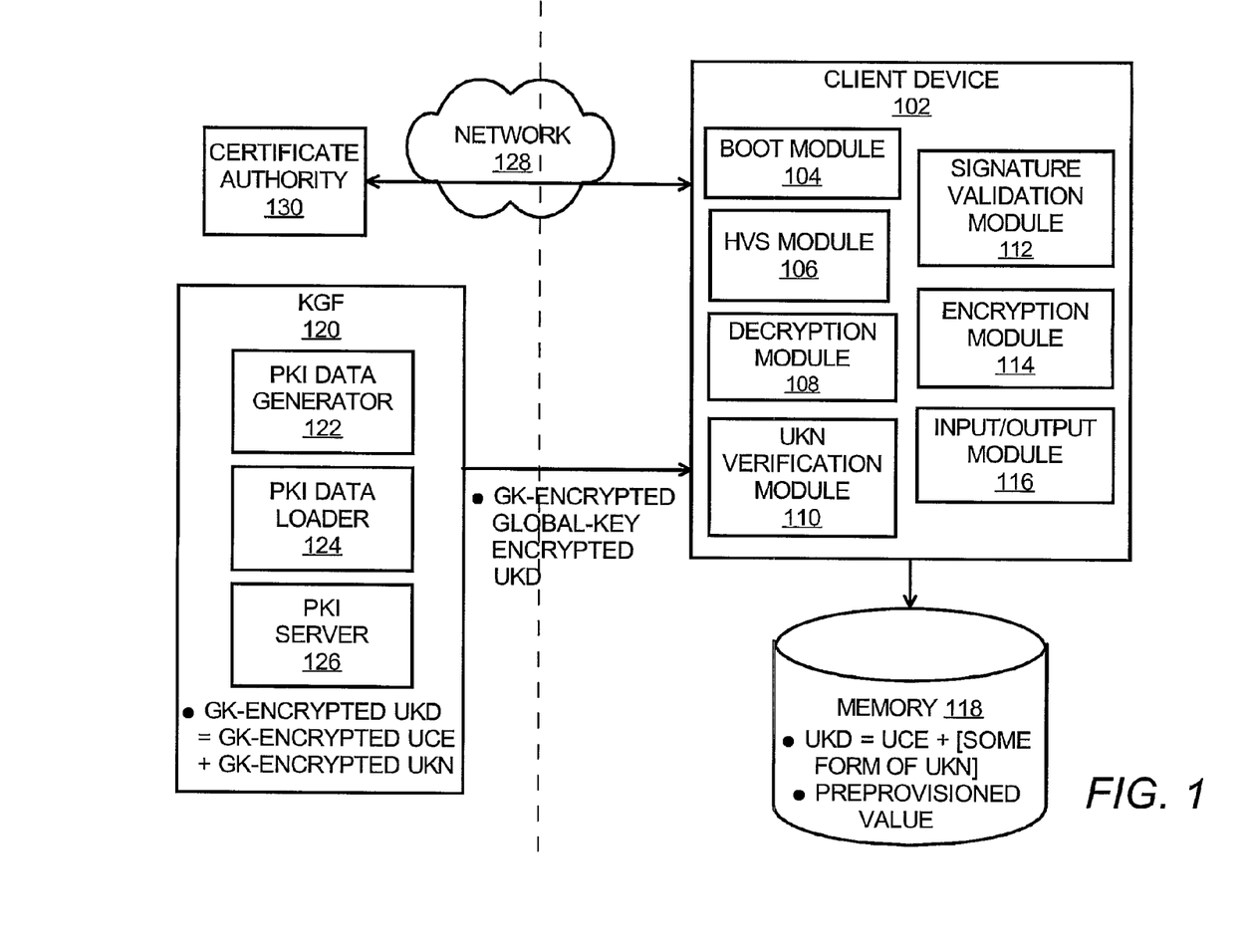
FIG. 1 illustrates a simplified block diagram a simplified block diagram of a system configured to allow detection of a unique cryptographic entity stored encrypted with a global key, according to an embodiment of the invention.

FIG. 1 illustrates a simplified block diagram of a system 100 configured to allow detection of a UCE encrypted with a GK in a client device 102. The system 100 comprises the client device 102, and a KGF 120. The KGF 120 generates the GK-encrypted UCE, which is assumed to have been encrypted with a GK, and concatenates the GK-encrypted UCE with a GK-encrypted UKN to form a GK-encrypted UKD as described in detail with respect to FIG. 3. The GK-encrypted UKD from the KGF is then loaded into the client device 102. The client device 102 decrypts the GK-encrypted UKD with the GK and re-encrypts the decrypted UKD in a manner that allows the client device 102 to reject a UCE encrypted with the GK when the client device 102 is initialized and rebooted as described in detail with respect to FIGS. 2A-2B.

The client device 102 may include a boot module 104, a HVS module 106, a decryption module 108, a UKN verification module 110, a signature validation module 112, an encryption module 114, an input/output module 116, and a memory 118. The components 104-116 are configured to perform the methods 200-220 described with respect to FIGS. 2A-2B. The components 104-116 may comprise software modules, hardware modules, and a combination of software and hardware modules. Thus, in one embodiment, one or more of the modules 104-116 comprise circuit components. In another embodiment, one or more of the modules 104-116 comprise software code stored on a computer readable storage medium, which is executable by a processor. It should be understood that the system 100 depicted in FIG. 1 may include additional components and that some of the components described herein may be removed and/or modified without departing from a scope of the system 100.

The client device 102 may comprise any suitable device that uses keys and/or other PKI data or information for some purpose, e.g., DRM. For example, the client device 102 may include but is not limited to a set top box (STB), a digital video recorder (DVR) or digital video server (DVS) device, including any signal converter or decoder with internal and/or external recording capabilities and local and/or remote storage, which often are referred to as personal video recorder (PVR) devices. Other suitable manufactured products include a digital videodisk recorder, a computer, a television, and any suitable mobile end user communication device, such as a cellular telephone, a smartphone, a personal digital assistant (PDA) device or other wireless handheld device, a digital camera, a laptop personal computer (PC) or a notebook PC.

The KGF 120 may be connected to the client device 102 through a network 128 in order to provide the encrypted UKD at a product personalization factory (not shown) or when the KGF 120 serves as a CA 130. Alternately, the KGF 120 may be a secure off-line facility from which the encrypted UKD is transferred to the product personalization factory in order to load the encrypted UKD into the client device 102. The KGF 120 may include a PKI data generator 122 and a PKI data loader 124 coupled to the PKI data generator 122. The KGF 120 may also include a PKI server 126 coupled to the PKI loader 124 via one or more networks. The components of the KGF 120 are configured to perform the method 300 as described in detail with respect to FIG. 3.

It will be apparent that the system 100 may include additional elements not shown and that some of the elements described herein may be removed, substituted and/or modified without departing from the scope of the system 100. It should also be apparent that one or more of the elements described in the embodiment of FIG. 1 may be optional.

An example of methods in which the system 100 may be employed to allow detection of the UCE encrypted with the GK now be described with respect to the following flow diagram of the methods 200, 220 depicted in FIGS. 2A-B. It should be apparent to those of ordinary skill in the art that the methods 200, 220 represent a generalized illustration and that other steps may be added or existing steps may be removed, modified or rearranged without departing from the scopes of the methods 200, 220. In addition, the methods 200, 220 are described with respect to the system 100 by way of example and not limitation, and the methods 200 may be used in other systems.

Some or all of the operations set forth in the methods may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

Figure 2A:
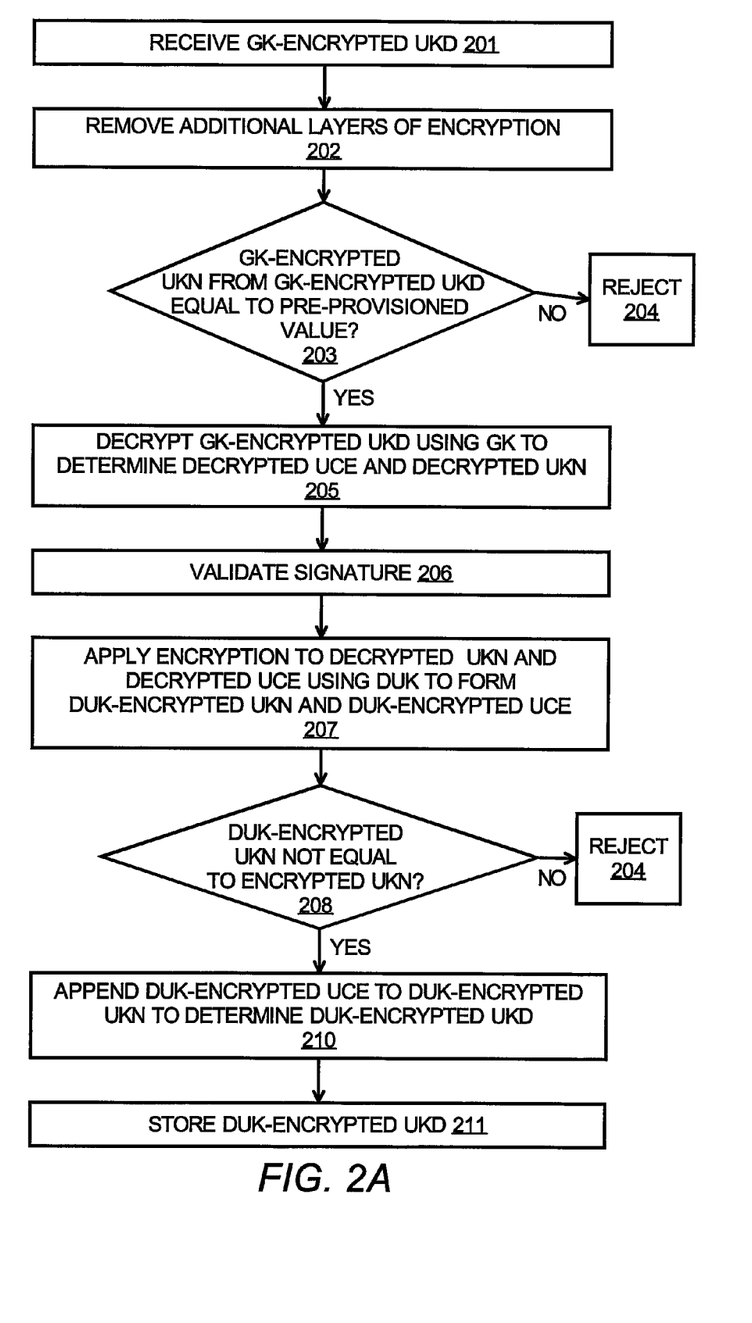
FIG. 2A illustrates a flow diagram of a method of initialization of a client device with an encrypted unique cryptographic entity, according to an embodiment of the invention.

The method 200, as shown in FIG. 2A, represents initialization of a client device 102 with an encrypted UCE in a manner that allows detection of the UCE encrypted with the GK.

At step 201, as shown in FIG. 2A, the client device 102 is operable to receive PKI data, such as a GK-encrypted UKD, through the input/output module 116. The GK-encrypted UKD may be loaded into the client device 102 using the loading module 106 at the product personalization facility. The GK-encrypted UKD comprises a GK-encrypted UKN concatenated with the GK-encrypted UCE. According to an embodiment the GK-encrypted UCE is an EUK. For instance, the EUK may comprise a private key in a PKI. The EUK is a random number, unique per device, and is assumed to be encrypted. According to another embodiment, the GK-encrypted UCE is an asymmetric key that is generated randomly, for instance an Elliptic Curve private key or a Diffie-Hellman private key. Further, the GK-encrypted UKD may include encrypted hardware specific information (HSI). Additionally, the GK-encrypted UKD may include a signature, which indicates the source of the GK-encrypted UKD. The signature may provide an additional layer of protection. Optionally, the GK-encrypted UKD may be encrypted in additional layers of encryption.

At step 202, the decryption module 108 may be configured to remove the additional layers of encryption, in instances where the GK-encrypted UKD has been encrypted with additional layers of encryption to obtain the GK-encrypted UKD.

At step 203, the UKN verification module 110 of the client device 102 is operable to verify the authenticity of the GK-encrypted UKN in the GK-encrypted UKD received at the client device 102 at step 201. The client device 102 may compare the GK-encrypted UKN with a pre-provisioned value, which may be previously stored in the client device 102. The pre-provisioned value is equal to the GK-encrypted UKN, which may be provided by the factory. If the GK-encrypted UKN received at step 201 does not match the pre-provisioned value, the GK-encrypted UKN received at step 201 is not authentic and the UKN verification module 110 rejects the encrypted UKD at step 204. Where the encrypted UKD is rejected, the client device 102 will be inoperable to use the UCE as a cryptographic identity and the client device 102 will be unable to access content protected by embodiments of this invention. If the GK-encrypted UKN matches the pre-provisioned value, the GK-encrypted UKN is authentic and the UKN verification module proceeds to step 205. Note that the UKN does not need to be decrypted for the comparison to the pre-provisioned value. Instead, the GK-encrypted UKN may be compared to the pre-provisioned value.

At step 205, the decryption module 108 of the client device 102 is operable to decrypt the GK-encrypted UKD using the GK previously stored in the client device 102 to determine a decrypted UKD. The decrypted UKD includes a decrypted UCE and a decrypted UKN. The decrypted UKD may also include decrypted HSI in instances where the GK-encrypted UKD received at step 201 included appended encrypted HSI.

At step 206, the signature validation module 112 of the client device 102 is configured to validate the signature field over the decrypted UKD (which includes at least the decrypted UCE and the decrypted UKN) using a public key that is preferably protected by the hardware. The client device 102 is configured to thereafter transfer the decrypted UCE and the decrypted UKN to the memory 118. The memory 118 may comprise a secure random access memory (RAM).

At step 207, the encryption module 114 of the client device 102 is operable to encrypt the previously-decrypted UCE and the previously-decrypted UKN with the DUK of the client device 102 to form the DUK-encrypted UCE and the DUK-encrypted UKN. What changes after re-encryption at step 206 is the encrypted form of the UKN. The GK-encrypted UKN is a pre-defined global value that is stored in the client device 102 as the pre-provisioned value and used at step 203. After decrypting the GK-encrypted UKN with the global key and re-encrypting with the DUK of the client device 102, the resulting DUK-encrypted UKN is no longer the pre-provisioned value. However, the decrypted version of the UKN does not change.

At step 208, the encryption module 114 of the client device 102 is operable to verify that the DUK-encrypted UKN is not equal to the GK-encrypted UKN from the KGF 120. At step 204, if the DUK-encrypted UKN is equal to the GK-encrypted UKN, the UKN verification module 110 rejects the encrypted UKD. However, at step 210, if the DUK-encrypted UKN is not equal to the GK-encrypted UKN, the encryption module 114 appends the DUK-encrypted UCE to the DUK-encrypted UKN to determine a DUK-encrypted UKD. The DUK-encrypted UKD may also include DUK-encrypted HSI and additional data.

At step 211, the client device 102 is operable to store the DUK-encrypted UKD in the memory 118 in persistent storage for future use.

Figure 2B:
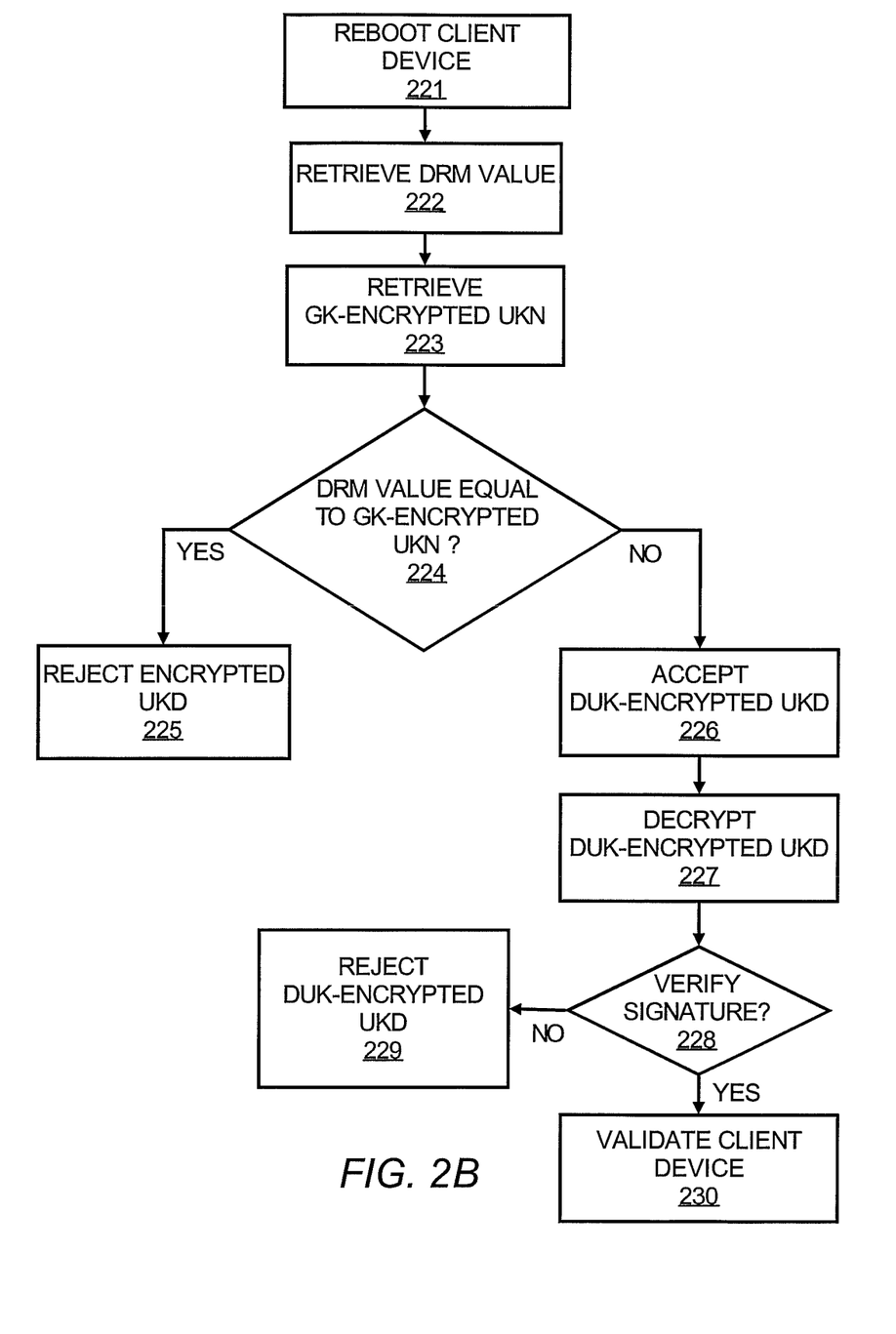
FIG. 2B illustrates a flow diagram of a method of rebooting of a client device with a unique cryptographic entity, according to an embodiment of the invention.

The method 220, as shown in FIG. 2B, represents re-booting of the client device 102 with the UKD in a manner that allows detection of the UCE encrypted with the GK. The method 220 is performed to verify, after re-booting, whether the step 211 of storing the DUK-encrypted UKD in the memory 118 was performed.

With respect to FIG. 2B, at step 221, the boot module 104 of the client device 102 is operable to re-boot the client device 102. At step 222, the boot module 104 is operable to retrieve an encrypted value for DRM (referred to as the DRM value) stored in the memory 118, which should be the DUK-encrypted UKD from step 111.

At step 223, the boot module 104 is operable to access the pre-provisioned value, which is equal to the GK-encrypted UKN as shown in step 203. The client device 102 may have stored the pre-provisioned value in the memory 118. For instance, the pre-provisioned value is a pre-determined or a hardcoded value that is part of the device code image. Alternately, the client device 102 may contact the KGF 120 or other provider of the GK-encrypted UKN. The KGF 120 may thereafter send the GK-encrypted UKN to the input/output module 116 of the client device 102.

At step 224, the client device 102 is operable to determine whether the DRM value (e.g., the DUK-encrypted UKN) is equal to the GK-encrypted UKN. At step 225, if the client device 102 determines that the DRM value is equal to the GK-encrypted UKN (i.e., the steps of the method were not performed to store the DUK-encrypted UKN at step 211), the encrypted UKN has not been re-encrypted with the DUK and the boot module 104 rejects the encrypted UKD.

However, at step 226, if the client device 102 determines that the DRM value is not equal to the GK-encrypted UKN (e.g., the step 211 was performed to store the DUK-encrypted UKN), the boot module 104 accepts the DUK-encrypted UKD and proceeds at step 227 to decrypt the DUK-encrypted UKD.

At step 228, the UKN verification module 110 verifies the signature over the decrypted UCE and the decrypted UKN. If the signature is verified, the client device 102 may infer that the DUK-encrypted UCE and DUK-encrypted UKN values are secure and have not been altered or accessed by unauthorized parties. Steps 227 and 228 may be performed with secure hardware inside the HVS module 106. The decrypted UCE may thereafter be used by the client device 102, for instance as a private key to access DRM content in a PKI. The client device 102 may be thus configured to protect stored UCEs and the method 220 may prevent the use of cloned or duplicated UCEs encrypted with the GK to authenticate unauthorized client devices.

Figure 2C:
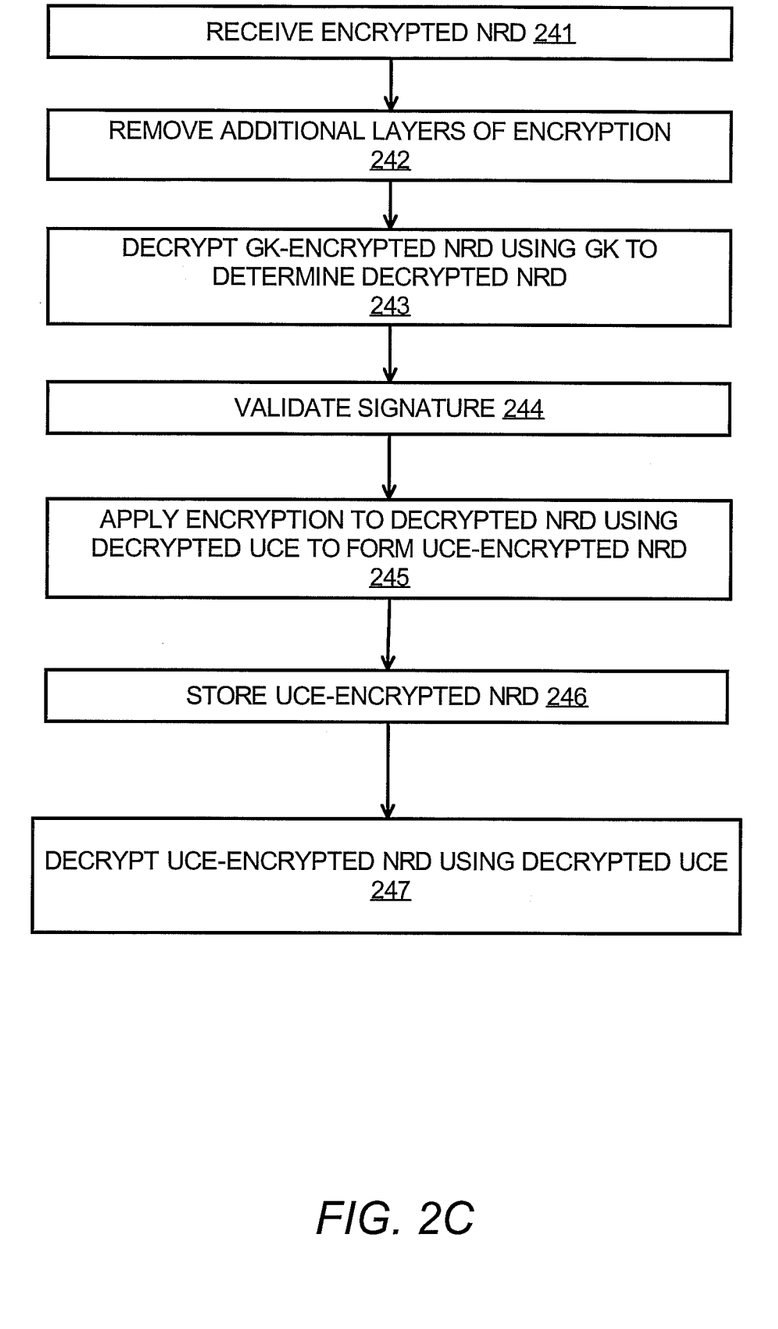
FIG. 2C illustrates a flow diagram of a method of encrypting a unique cryptographic entity, according to an embodiment of the invention.

The method 240, as shown in FIG. 2C, represents a method of using NRD with the GK-encrypted UKD.

At step 241, the input/output module 116 is configured to receive a GK-encrypted NRD. The input/output module 116 may be configured to receive the GK-encrypted NRD at the time of, or after, receipt of the GK-encrypted UKD at step 201. The NRD may comprise an RSA key or other sensitive non-random data.

At step 242, prior to decrypting the GK-encrypted NRD using the GK at step 243, the decryption module 108 may be configured to remove additional layers of encryption from the GK-encrypted NRD if the NRD was encrypted with optional additional layers of encryption.

At step 243, the decryption module 108 is configured to decrypt the GK-encrypted NRD using the GK.

At step 244, the signature validation module 112 may be configured to verify a signature field of the NRD, in instances where the NRD includes the signature field.

At step 245, the encryption module 114 is configured to re-encrypt the NRD using the decrypted UCE. The encryption module 114 may have received the decrypted UCE after decryption of the DUK-encrypted UKD after step 211 of method 200. Thereafter a UCE-encrypted NRD may be stored in the memory 118 for future use at step 246.

Thereafter, at step 247, after rebooting of the client device 102, as shown in the method 220, the decrypted UCE is used by the decryption module 108 to decrypt the UCE-encrypted NRD.

Figure 3:
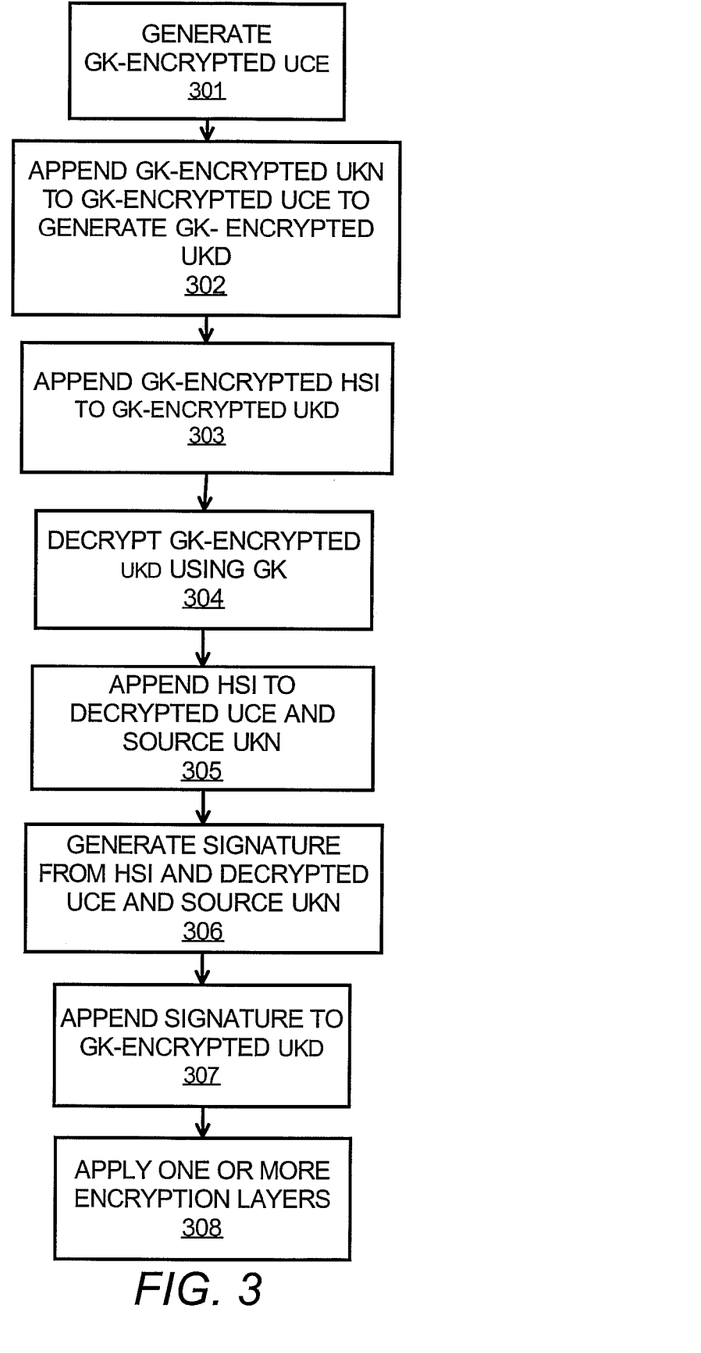
FIG. 3 illustrates a flow diagram of a method of generating unit key data, according to an embodiment of the invention.

The method 300, as shown in FIG. 3, represents a method of generating the UKD at the KGF, with the UKD encrypted by the GK.

With respect to FIG. 3, at step 301, the KGF 120 is operable to generate the GK-encrypted UCE, which may be the EUK. The GK-encrypted UCE is typically a random number. The UCE is a unique cryptographic identity of a device that can be a symmetric or private key.

At step 302, the KGF 120 is operable to append the GK-encrypted UKN to the GK-encrypted UCE to determine the GK-encrypted UKD.

At step 303, the KGF 120 is operable to encrypt and then append optional hardware-specific information (HSI) to the GK-encrypted UKD using the GK. Specific HSI may be required by HVS module 106 of a particular chip model. The KGF 120 may append additional data to the GK-encrypted UKD including the HSI.

At steps 304-307, the KGF 120 may optionally generate a signature field and append the signature field to the GK-encrypted UKD. The decrypted (alternately referred to as a clear key value of) UKD may be required to be digitally signed on some hardware platforms. In order for the KGF 120 to digitally sign the decrypted UKD, the concatenation of the GK-encrypted UCE and the GK-encrypted UKN may be decrypted together using the GK. At step 304, the KGF 120 decrypts the GK-encrypted UKD determining the decrypted UCE and the decrypted UKN using the GK. At step 305, the KGF optionally appends hardware specific information to the decrypted UCE and the decrypted UKN. Thereafter, at step 306 the KGF 120 generates a signature over the decrypted UKD (including additional optional data if appended) using a manufacturer private key.

The KGF 120 may be configured to thereafter, at step 307, add the signature to the GK-encrypted UKD, which may include an encrypted HSI. In addition, at the KGF 120, additional layers of encryption may be added to the GK-encrypted UKD.

At step 308, the GK-encrypted UKD may be encrypted with one or more encryption layers for securely transmitting the GK-encrypted UKD from the KGF 120 to the product personalization facility for loading onto the client device 102. The product personalization facility, which is not connected to or part of the KGF 120, is not assumed to be a secure environment.

Additionally, during initial generation at the KGF, this sensitive data may be encrypted using GK and optionally signed and optionally has additional layers of encryption. The KGF may also act as a certificate authority (CA). Where the KGF acts as a CA, the client device 102 is provisioned with both the GK-encrypted UKD and a corresponding digital certificate issued by the KGF.

Figure 4:
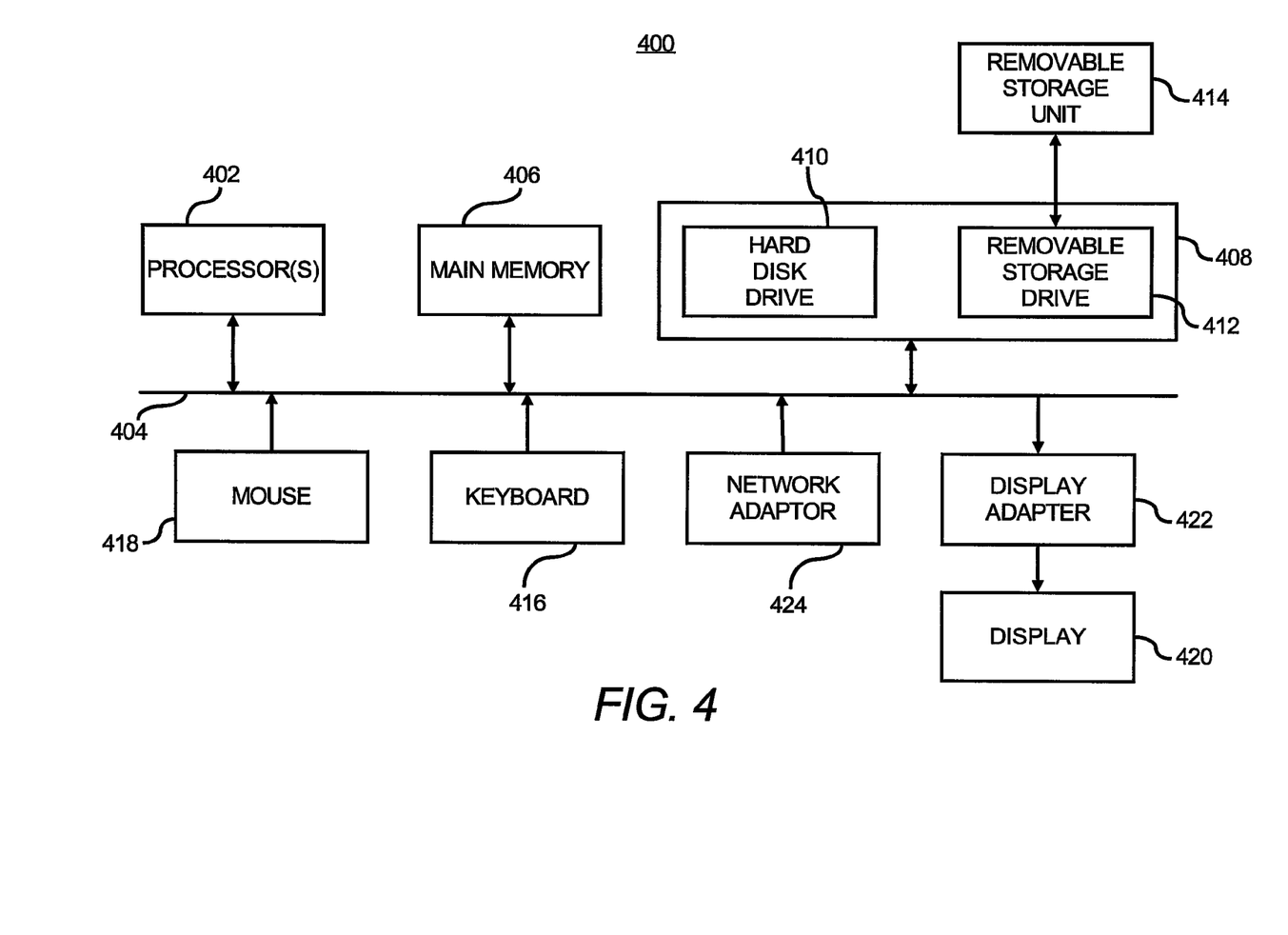
FIG. 4 shows a block diagram of a computer system 400 that may be used in the transcoder, according to an embodiment of the invention.

FIG. 4 illustrates a block diagram of a computing apparatus 400 configured to implement or execute one or more of the processes required to allow detection of a UCE stored encrypted with a GK depicted in FIGS. 2A-3, according to an embodiment. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the method depicted in FIGS. 2A-3. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for one or more of the processes depicted in FIGS. 2-3 may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

The embodiments of the invention provide a way of detecting encrypted UCEs that were stored encrypted with the GK instead of a chip unique key, herein the DUK. Embodiments of the invention are useful for hardware platforms that perform hardware decryption and do not report whether the global key (CEK) or the chip-unique key was used to decrypt.

By using an embodiment of the invention, a client device is able to verify that the UCE has been uniquely re-encrypted by checking the value of the encrypted UKN. This allows the client device to reject GK-encrypted copies of the UCE if the UCE is illegally copied or cloned into multiple devices. The unauthorized devices having the illegally cloned or copied UCE will not be allowed unauthorized access to content.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A client device, for enforcing digital rights management rules, the client device comprising:
   a set of processors; and
   a non-transitory computer-readable storage medium comprises instructions that when executed, causes the processor to perform the steps of:
   receiving a global-key (GK) encrypted unit key data (UKD), which includes a GK-encrypted unique cryptographic entity (UCE) and a GK-encrypted unit key number (UKN) from a key generation facility (KGF);
   decrypting the GK-encrypted UKD using a global key (GK) to determine a decrypted UCE and a decrypted UKN;
   encrypting the decrypted UKN and the decrypted UCE using a device unique key (DUK);
   creating a DUK-encrypted UKN and a DUK-encrypted UCE,
   wherein the DUK-encrypted UKN is a different value from the GK-encrypted UKN;
   forming the DUK-encrypted UCE to the DUK-encrypted UKN to form a DUK-encrypted UKD;
   storing the DUK-encrypted UKD in a memory;
   determining that a digital rights management (DRM) value is not equal to the GK-encrypted UKN; and
   based on that determination, performing the steps of:
   verifying the DUK-encrypted value was generated and stored;
   decrypting the DUK-encrypted UKD; and
   using the UCE as a cryptographic identity of the client device.

2. The client device according to claim 1, wherein the non-transitory computer-readable storage medium further comprises instructions that when executed causes the processor to perform the steps of:
   rebooting the client device; and
   determining that the DRM value is not equal to the GK-encrypted UKN; and
   based on that determination performing the steps of:
   verifying the DUK-encrypted value was generated and stored;
   decrypting the DUK-encrypted UKD; and
   using the UCE as a cryptographic identity of the client device.

3. The client device according to claim 2, wherein the non-transitory computer-readable storage medium further comprises instructions that, when executed causes the processor to perform the steps of:
   decrypting a non-random data (NRD) using the decrypted UCE.

4. The client device according to claim 1, wherein the non-transitory computer-readable storage medium further comprises instructions that, when executed causes the processor to perform the steps of:

receiving a GK-encrypted NRD after receipt of the GK-encrypted UKD;
decrypting the GK-encrypted NRD using the GK; and
re-encrypting the NRD using the decrypted UCE, after decryption of the DUK-encrypted UCE with the DUK.

5. The client device according to claim 4, wherein the non-transitory computer-readable storage medium further comprises instructions that, when executed causes the processor to perform the steps of:

validating a signature appended to the NRD after decryption of the GK-encrypted NRD using the GK.

6. The client device according to claim 1, wherein the non-transitory computer-readable storage medium further comprises instructions that, when executed causes the processor to perform the steps of:

decrypting the GK-encrypted UKD and using the GK;
creating the decrypted UCE and the decrypted UKN; and
validating a signature field.

7. The client device according to claim 1, wherein the non-transitory computer-readable storage medium further comprises instructions that, when executed causes the processor to perform the steps of:

removing encryption from the GK-encrypted UKD before removing encryption from the GK-encrypted UKD using the GK to determine the decrypted UCE and the decrypted UKN.

8. The client device according to claim 1, wherein the non-transitory computer-readable storage medium further comprises instructions that, when executed causes the processor to perform the steps of:

extracting a hardware service information (HSI) from the UKD.

9. A method comprising:

receiving a global-key (GK) encrypted unit key data (UKD), which includes a GK-encrypted unique cryptographic entity (UCE) and a GK-encrypted unit key number (UKN) from a key generation facility (KGF);
decrypting the GK-encrypted UKD using a global key (GK) to determine a decrypted UCE and a decrypted UKN;
encrypting, by a client device, the decrypted UKN and the decrypted UCE using a device unique key (DUK) to determine a DUK-encrypted UKN and a DUK-encrypted UCE, wherein the DUK-encrypted UKN is a different value from the GK-encrypted UKN;
creating a DUK-encrypted UKN and a DUK-encrypted UCE;
forming, by the client device, the DUK-encrypted UCE to the DUK-encrypted UKN to form a DUK-encrypted UKD in a memory;
storing, by the client device, the DUK-encrypted UKD in a memory;
determining, by the client device, that a digital rights management (DRM) value is not equal to the GK-encrypted UKN; and
based on that determination, then performing the steps of:
verifying, by the client device, the DUK-encrypted value was generated and stored;
decrypting, by the client device, the DUK-encrypted UKD; and
using, by the client device, the UCE as a cryptographic identity of the client device.

10. The method of claim 9, further comprising:
rebooting the client device; and
determining that the DRM value is not equal to the GK-encrypted UKN; and
based on that determination, performing:
verifying the DUK-encrypted value was generated and stored;
decrypting the DUK-encrypted UKD; and
using the UCE as a cryptographic identity of the client device.

11. The method of claim 10, further comprising decrypting, by the computing device, a non-random data (NRD) using the decrypted UCE.

12. The method of claim 9, further comprising: receiving a GK-encrypted NRD after receipt of the GK-encrypted UKD; decrypting the GK-encrypted NRD using the GK; and re-encrypting the NRD using the decrypted UCE, after decryption of the DUK-encrypted UCE with the DUK.

13. The method of claim 12, further comprising validating a signature appended to the NRD after decryption of the GK-encrypted NRD using the GK.

14. The method of claim 9, further comprising:
decrypting the GK-encrypted UKD using the GK;
creating the decrypted UCE and the decrypted UKN; and
validating a signature field.

15. The method of claim 9, further comprising:
removing encryption from the GK-encrypted UKD before removing encryption from the GK-encrypted UKD using the GK;
creating the decrypted UCE and the decrypted UKN.

16. The method of claim 9, further comprising extracting a hardware service information (HSI) from the UKD.

17. A non-transitory computer-readable storage medium containing instructions, that when executed, causes the processor to perform the steps of:

receiving a global-key (GK) encrypted unit key data (UKD), which includes a GK-encrypted unique cryptographic entity (UCE) and a GK-encrypted unit key number (UKN) from a key generation facility (KGF);
decrypting the GK-encrypted UKD using a global key (GK) to determine a decrypted UCE and a decrypted UKN;
encrypting, by a client device, the decrypted UKN and the decrypted UCE using a device unique key (DUK);
wherein the DUK-encrypted UKN is a different value from the GK-encrypted UKN;
creating a DUK-encrypted UKN and a DUK-encrypted UCE;
forming, by the client device, the DUK-encrypted UCE to the DUK-encrypted UKN to form a DUK-encrypted UKD in a memory;
storing, by the client device, the DUK-encrypted UKD in a memory;
determining, by the client device, that a digital rights management (DRM) value is not equal to the GK-encrypted UKN; and
based on that determination, then performing the steps of:
verifying, by the client device, the DUK-encrypted value was generated and stored;
decrypting, by the client device, the DUK-encrypted UKD; and
using, by the client device, the UCE as a cryptographic identity of the client device.

18. The client device of claim 1, wherein the non-transitory computer-readable storage medium further comprises instructions when executed causes the processor to perform the steps of:

determining that the DRM value is equal to the GK-encrypted UKN;

determining the DUK-encrypted value was not generated and stored in the client device; and rejecting the encrypted UKD.

19. The client device of claim 1, wherein the non-transitory computer-readable storage medium further comprises instructions when executed causes the processor to perform the steps of:

determining that either the GK-encrypted UKN or the DUK-encrypted UKN is stored in the memory, and finding that the DRM value is one of the GK-encrypted UKN or the DUK-encrypted UKN.

* * * * *